Dec. 17, 1968
D. L. KESLING
3,416,229
ORTHODONTIC UPRIGHTING SPRING
Filed Jan. 23, 1967
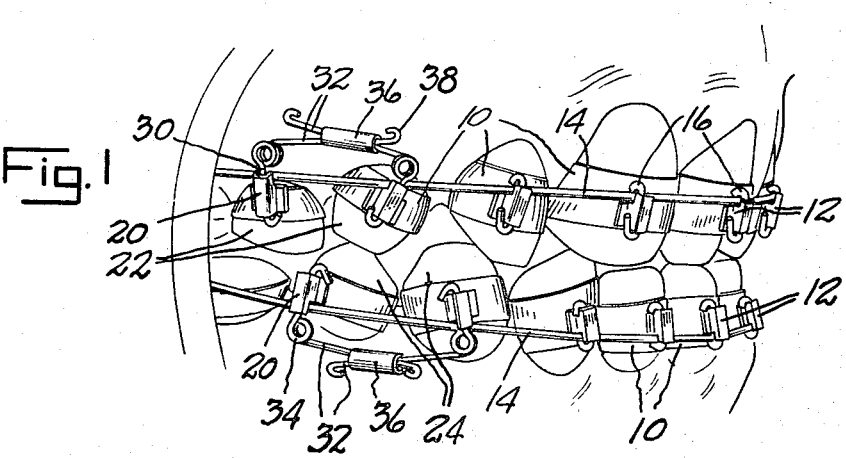
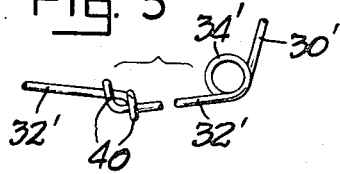
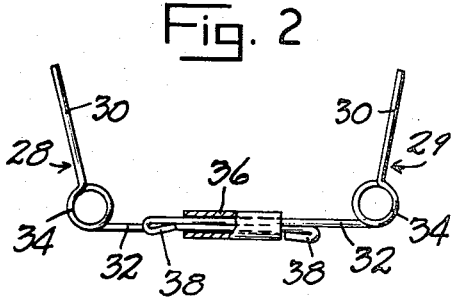
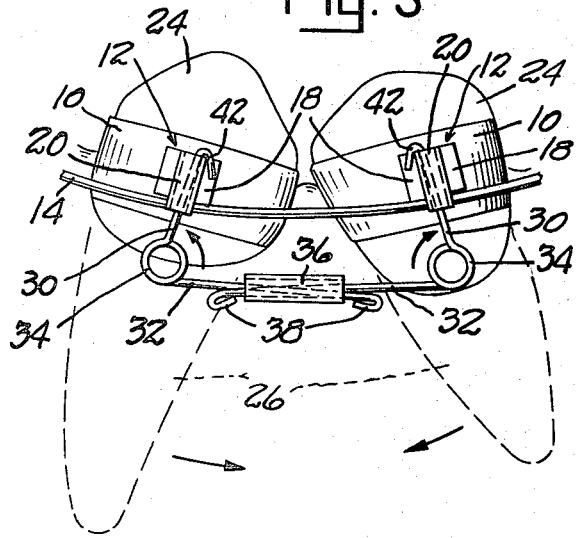
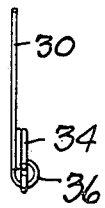
INVENTOR.
DAVID L. KESLING
BY Eugene C. Knoblock
ATTORNEY United States Patent Office 3,416,229
Patented Dec. 17, 1968

3,416,229
ORTHODONTIC UPRIGHTING SPRING
David L. Kesling, 3843 Hiawatha Drive, Michiana Shores, Michigan City, Ind. 46360
Filed Jan. 23, 1967, Ser. No. 610,845
8 Claims. (Cl. 32—14)

ABSTRACT OF THE DISCLOSURE

An orthodontic uprighting spring having two spring wires each having a coiled part intermediate its ends, wherein adjacent end parts are slidably connected and the opposite end parts are anchored to bands carried by adjacent tilted teeth independently of arch wires to exert uprighting force upon said teeth.

---

This invention relates to improvements in orthodontic uprighting springs.

Orthodontists sometimes encounter conditions of a patient's teeth wherein adjacent teeth are characterized by laterally diverging roots. Such conditions, for example, can be caused by the removal of a tooth followed by gradual movement of the tooth crowns of the adjacent teeth into the intervening space and toward each other. This tilts the teeth relative to each other. The usual orthodontic treatment required to correct the tilted position of the teeth is by movement of the roots of the adjacent teeth into substantial parallel or more normal orientation to each other.

Heretofore in the treatment of such a condition it has been common practice to employ springs each associated with a tooth and engaged or anchored on the arch wire commonly employed for orthodontic procedures. This practice introduces a force on the arch wire which is not desired because it tends to introduce conditions or stresses acting upon the arch wire differently from those intended for orthodontic procedure in connection with other teeth than those with laterally diverging roots. Also, such prior practices have been subject to interference with tooth adjustment produced by the spring, as in instances where a hook of the spring which engages the arch wire may slide thereon incident to the adjustment and may abut a tooth with resultant limitation upon or interference with the desired continued spring urged movement of the tooth or teeth to be uprighted.

The primary object of this device is to overcome the disadvantages of prior practices, and in particular to provide a construction which allows freedom of movement of each spring relative to the parts to which it is anchored and relative to which it exerts its uprighting force upon a tilted tooth.

A further object is to provide a device of this character which is usable upon upper and lower tilted teeth at both the right and the left quadrants.

A further object is to provide a device of this character which can be used between any pair of adjacent teeth, as between cuspids and bicuspids, so that it is applicable without requiring care or choice of location.

A further object is to provide a device applicable to adjacent tilted teeth which can be handled as a unit or assembly to be applied to and extend between the adjacent teeth to be uprighted.

Other objects will be apparent from the following specification.

In the drawing:

FIG. 1 is a perspective view illustrating my improved device applied to both upper and lower pairs of tilted teeth.

FIG. 2 is a side view of a spring device forming one embodiment of the invention, with parts broken away.

FIG. 3 is a view illustrating the application of the spring device to a pair of teeth to be uprighted, illustrating the forces applied to the teeth by the device.

FIG. 4 is an end view of the device shown in FIG. 2.

FIG. 5 is a fragmentary plan view of a spring device constituting a modified embodiment of the device.

Referring to the drawing, the numeral 10 designates tooth bands mounted upon individual teeth with at least some of said bands carrying brackets 12 secured thereto. An arch wire 14 engages selected bands and brackets and is maintained in selected position to the banded teeth by means of retainers 16 anchored to the brackets and engaging the arch wire. The ends of the arch wire 14 are anchored by suitable bracket members, not shown, which are carried by bands upon anchor teeth, as well understood in the art.

The tooth bands 10 are of conventional character, being formed of metal, and are applied to the individual teeth in the conventional manner well understood in the art. The bands 10 are preferably narrow compared to the lengths of the projecting or crown portions of most of the teeth upon which they are mounted. Bands 10 are positioned in selected relation to the gums of the patient, with most if not all thereof preferably terminating clear of the gums, as illustrated in FIG. 1.

Brackets 12 may be of any suitable shape or type and preferably are elongated and of generally U-shape configuration, having a pair of laterally projecting flanges or wing portions 18 at opposite sides of each at which the bracket is soldered or otherwise fixedly secured to the band. The flange portions 18 preferably are of a length less than the length of the central U-shaped part 20 of the bracket, as best seen in FIG. 3. The U-shaped central part of 20 of the bracket is preferably cut-away to permit the arch wire 14 to seat between the projecting part thereof and the tooth band 10. The length of the bracket 12 is preferably less than the width of the band 10 so that the arch wire may engage the band 10 spaced from the edge of the band.

The retainers 16 are releasably anchored to the brackets 12 and may constitute wires or pins extending through the elongated U-shape socket defining parts 20 and bent therefrom, or so configured at opposite ends thereof as to be anchored firmly to the brackets and to hold the arch wire 14 in desired relation to the brackets, the bands and the teeth mounting the bands.

The arch wire 14 is curved to substantially conform to the curvature of the dental arch or that portion to be treated. If desired, supplemental torquing arch wires (not shown) may be employed at selected positions to act in conjuction with the arch wire upon selected teeth as required to effect correction of the position thereof either lingually, palatally, labially, mesially or distally, as well understood in the art.

My improved uprighting spring is to be used in association with the above described orthodontic appliances at selected portions of the mouth at which adjacent teeth, such as upper teeth 22 and lower teeth 24, seen in FIGS. 1 and 3, have converging crown portions from which the respective root portions 26 extend in divergent relation, as seen in FIG. 3.

My improved uprighting spring comprises a pair of complementary spring sections 28 and 29 which preferably are respectively formed as lefts and rights. Each of the spring parts 28 and 29 is formed of spring wire of suitable gauge and resilience. Each of the spring parts 28 and 29 includes an elongated end part 30 which I prefer to designate as an anchoring part and an opposite elongated end part 32 which I prefer to designate a connector part.

The two end parts 30 and 32 are interconnected by an intermediate coil part 34 which may consist of a selected number of turns or coils and preferably more than one full coil or turn. Each spring part 28 and 29 is so shaped that the angular relation between the axes of the anchor part 30 and the connector part 32 is greater than 90°, as best seen in FIG. 2.

Suitable means are provided to interlock the connector end parts 32 of the complementary springs 28 and 29 in a manner to permit them to slide lengthwise relative to each other. In the form shown in FIG. 2, an elongated tubular member 36 loosely encircles and slidably receives therein the connector parts 32 of the spring parts 28 and 29. Tube 36 is of a length substantially less than the connector parts 32, and has a bore of a diameter to provide free sliding of said connector parts and limited tilting or angular displacement thereof. Each connector part 32 has a bent end part 38 which preferably is return bent, as illustrated, and serves as a retainer to prevent separation of the spring parts 28 and 29 from the tubular member 36. The assembly so provided accommodates limited rotation of the spring members 28, 29 relative to each other, accommodates variation of the spacing of the anchor parts 30 from each other, and accommodates a limited angular displacement of the connector parts relative to each other. The two spring parts 28 and 29 are so assembled that when the anchoring parts 30 thereof are positioned in the same or substantially the same plane they will extend divergently from the respective coil portions 34 thereof.

An alternative embodiment of the invention is illustrated in FIG. 5, wherein the connector end parts 32' of the spring parts 28, 29 terminate in loops 40 bent therefrom in a plane lying at a angle to and transverse of the connector parts 32'. The spring parts are so arranged that the loop 40 carried by each connector part 32 encircles the other connector part 32' of the paired springs 28, 29. The loops 40 fit slidably upon the encircled connector parts so that endwise movement of the connector parts 32' and limited rocking and angular displacement thereof may occur. The same divergent relationship of the anchoring parts 30' from the coil parts 34' occurs in this embodiment as described previously.

It will be observed that in this invention the springs required to act upon adjacent tilted teeth are preassembled and form a unit which can be handled conveniently. The spring units are applied to the tilted teeth in the manner best illustrated in FIG. 3, with the anchoring portions 30 thereof being secured to the brackets 12 on the tooth bands 10. In the construction illustrated, the anchor parts 30 are passed through the U-shaped parts 20 of the brackets and are bent at 42 at their ends to insure their retention upon the brackets. The springs are flexed or deflected from their normal position with the anchor parts 30 diverging from the coil parts 34 into the position shown in FIG. 3 in which the anchor parts 30 converge from the coil parts 34. This deflection of the springs in mounting them upon the teeth exerts uprighting forces upon the teeth. These forces are principally exerted in the directions designated by the arrows in FIG. 3 and tend to move the roots of the teeth into substantial parallelism or normal orientation in the jaw.

It will be observed that the action exerted by the uprighting springs is independent of the action exerted by the arch wire 14. Thus, the uprighting spring cooperates with the arch wire during the orthodontic process, but does not detrimentally effect the intended action of the arch wire upon the teeth. Note in this connection that the uprighting spring need not have any connection to or contact with the arch wire 14.

An important consideration in the functioning of this device is that the spring parts 28 and 29 of each pair or unit may adjust themselves freely incident to the progressive uprighting of the adjacent teeth. Thus, as the uprighting of the tooth roots occurs, variation in the spacing between the brackets of the paired tilted teeth may occur, which variation of spacing can be accommodated by the free sliding of the connector parts 32 of the unit relative to each other.

Another important consideration is that the unitary character of the device, even though composed of rights and lefts, eliminates care in selection of location and application of the spring. In other words, since an assembled right and left spring is provided in the device, the orientation of the right and left spring is predetermined in the assembly. Consequently, the orthodontist need not be concerned with whether a given spring part is a right or a left spring, as is necessary in cases where springs are handled individually and applied separately to individual teeth.

Another consideration of the device is that its use is not limited to teeth located side by side, inasmuch as the device, if provided of suitable dimensions, may act upon two tilted teeth which are separated by or at opposite sides of one or more intervening teeth.

Still another alternative embodiment of the invention (not shown) entails the fixed mounting of an elongated tubular member 36 upon the free end of one connector part 32 of one of the springs 28, 29 as by soldering or welding, in a position to slidably and rotatably receive therein the connector part 32 of the other of said pair of springs 28, 29.

While the preferred embodiment of the invention has been illustrated and described, it will be understood that changes in the construction may be made within the scope of the appended claims without departing from the spirit of the invention.

I claim:
1. An uprighting spring unit for use in orthodontia and adapted to be anchored to brackets carried by tooth bands on adjacent teeth having diverging roots, comprising
    a pair of complementary wire spring members, each spring member including
    an elongated first end portion adapted to be anchored to a bracket,
    an elongated second end portion, and
    a coiled intermediate portion,
    said first and second end portions extending in obtuse angle relation to each other from said coiled portion, and
    means loosely interconnecting said second end portions of said pair of spring members to accommodate relative endwise sliding thereof incident to progressive repositioning of said teeth toward parallelism by the force exerted by said connected springs.

2. A spring unit as defined in claim 1, wherein
    said interconnecting means constitutes an elongated tubular member loosely encircling and of shorter length than said second end portion,
    said second end portions having bent terminal retainer portions engageable with opposite ends of said tubular member to limit relative sliding of said second end portions.

3. A spring unit is defined in claim 1, wherein
    said interconnecting means constitute a loop on the free end of the second end portion of each spring member loosely encircling the second end portion of the other spring member.

4. In combination,
    a plurality of tooth-encircling bands,
    a plurality of brackets carried by selected bands including adjacent bands encircling teeth having diverging roots,
    an arch wire anchored to selected teeth by said brackets, and
    uprighting spring means secured to and extending between brackets on adjacent teeth having diverging roots,
    said last named spring means being independent of said arch wire and comprising a pair of complementary spring members and means slidably interconnecting said spring members, said spring members having bracket-anchored elongated portions which normally extend in angular relation to each other and are deflected when anchored to the brackets on said divergently rooted teeth to exert an uprighting action thereupon.

5. The combination defined in claim 4, wherein said spring members are formed of spring wire having a coiled part intermediate the ends thereof and being of substantially L-shape.

6. The combination defined in claim 4, wherein said brackets have elongated passages therethrough in which said elongated portions of said spring members are retained.

7. The combination defined in claim 4, wherein said spring interconnecting means constitute a looped end portion of an elongated connector part of each spring member, each looped end portion slidably encircling the connector part of the other spring member.

8. The combination defined in claim 4, wherein said spring interconnecting means constitute an elongated tubular member slidably encircling and of shorter length than complementary elongated connector portions of said respective spring members.

References Cited
UNITED STATES PATENTS

| | | | |
|---|---|---|---|
| 3,076,265 | 2/1963 | Moore | 32—14 |
| 3,093,903 | 6/1963 | Kesling | 32—14 |
| 3,162,948 | 12/1964 | Gerber | 32—14 |
| 3,237,305 | 1/1966 | Hegedus | 32—14 |

LOUIS G. MANCENE, *Primary Examiner.*

ROBERT PESHOCK, *Assistant Examiner.*